(12) United States Patent
Willis

(10) Patent No.: US 10,289,836 B1
(45) Date of Patent: May 14, 2019

(54) WEBPAGE INTEGRITY MONITORING

(71) Applicant: SecurityMetrics, Inc., Orem, UT (US)

(72) Inventor: Aaron Willis, Orem, UT (US)

(73) Assignee: SecurityMetrics, Inc., Orem, UT (US)

( * ) Notice: Subject to any disclaimer, the term of this patent is extended or adjusted under 35 U.S.C. 154(b) by 0 days.

(21) Appl. No.: 15/983,951

(22) Filed: May 18, 2018

(51) Int. Cl.
G06F 21/51 (2013.01)
G06F 21/64 (2013.01)
H04L 29/06 (2006.01)
H04L 9/32 (2006.01)

(52) U.S. Cl.
CPC .............. G06F 21/51 (2013.01); G06F 21/64 (2013.01); H04L 9/321 (2013.01); H04L 63/12 (2013.01); G06F 2221/2119 (2013.01)

(58) Field of Classification Search
CPC .. G06F 21/51; G06F 21/64; G06F 2221/2119; H04L 63/12; H04L 9/321
See application file for complete search history.

(56) References Cited

U.S. PATENT DOCUMENTS

| 7,958,555 | B1* | 6/2011 | Chen | G06F 21/554 726/22 |
| 9,148,445 | B2* | 9/2015 | Smith | G06F 21/554 |
| 9,819,654 | B2* | 11/2017 | Roth | H04L 9/3247 |
| 2007/0220134 | A1* | 9/2007 | Cameron | G06F 21/31 709/224 |
| 2011/0016169 | A1* | 1/2011 | Cahill | G06F 17/3089 709/203 |
| 2011/0093773 | A1* | 4/2011 | Yee | G06F 17/30896 715/235 |
| 2012/0222127 | A1* | 8/2012 | Boesgaard | G06F 21/31 726/26 |
| 2014/0173726 | A1* | 6/2014 | Varenhorst | H04L 63/1416 726/22 |
| 2015/0020194 | A1* | 1/2015 | Mraz | H04L 63/0227 726/22 |

(Continued)

OTHER PUBLICATIONS

S. Chen, J. Meseguer, R. Sasse, H. J. Wang and Y. Wang, "A Systematic Approach to Uncover Security Flaws in GUI Logic," 2007 IEEE Symposium on Security and Privacy (SP '07), Berkeley, CA, 2007, pp. 71-85. (Year: 2007).*

(Continued)

Primary Examiner — Kari L Schmidt
(74) Attorney, Agent, or Firm — Maschoff Brennan

(57) ABSTRACT

A method to monitor integrity of webpages. The method includes obtaining rendered code generated using source code of a webpage from a server that hosts the webpage and using remotely called code referenced in the source code, the rendered code used to display the webpage. The method also includes determining a difference between the rendered code and previous rendered code of the webpage. The previous rendered code may be generated before obtaining the rendered code. The method further includes analyzing the difference between the rendered code and the previous rendered code to determine a change in integrity of security of the webpage and in response to a change in the integrity of security of the webpage, generating an alert regarding the integrity of security of the webpage that may indicate the integrity of the webpage may have changed.

20 Claims, 6 Drawing Sheets

(56) References Cited

U.S. PATENT DOCUMENTS

| | | | | |
|---|---|---|---|---|
| 2015/0244738 | A1* | 8/2015 | Lu | G06F 21/56 |
| | | | | 726/23 |
| 2016/0125185 | A1* | 5/2016 | Wang | H04L 63/1433 |
| | | | | 726/23 |
| 2016/0142428 | A1* | 5/2016 | Pastore | H04L 63/1466 |
| | | | | 726/23 |
| 2018/0048671 | A1* | 2/2018 | Shekyan | G06F 16/958 |
| 2018/0139296 | A1* | 5/2018 | Yeh | H04L 61/30 |
| 2018/0205549 | A1* | 7/2018 | Blinn | H04L 9/3236 |

OTHER PUBLICATIONS

Singh, Kapil, et al. "Practical end-to-end web content integrity." Proceedings of the 21st international conference on World Wide Web. ACM, 2012. (Year: 2012).*

International Search Report and Written Opinion received in International Application No. PCT/US2019/018060, dated Mar. 15, 2019.

* cited by examiner

WEBPAGE INTEGRITY MONITORING

FIELD

The embodiments discussed herein are related to monitoring the integrity of webpages.

BACKGROUND

Financial transactions are occurring over the Internet at a rapidly expanding pace as more and more people purchase goods and services online. As a result, more and more companies are offering their goods and services online as well. As more business is conducted online, hackers and others are using more sophisticated techniques to obtain credit card and other financial data of customers of online merchants.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to monitor integrity of webpages. The method includes obtaining rendered code generated using source code of a webpage from a server that hosts the webpage and using remotely called code referenced in the source code, the rendered code used to display the webpage. The method also includes determining a difference between the rendered code and previous rendered code of the webpage. The previous rendered code may be generated before obtaining the rendered code. The method further includes analyzing the difference between the rendered code and the previous rendered code to determine a change in integrity of security of the webpage and in response to a change in the integrity of security of the webpage, generating an alert regarding the integrity of security of the webpage.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
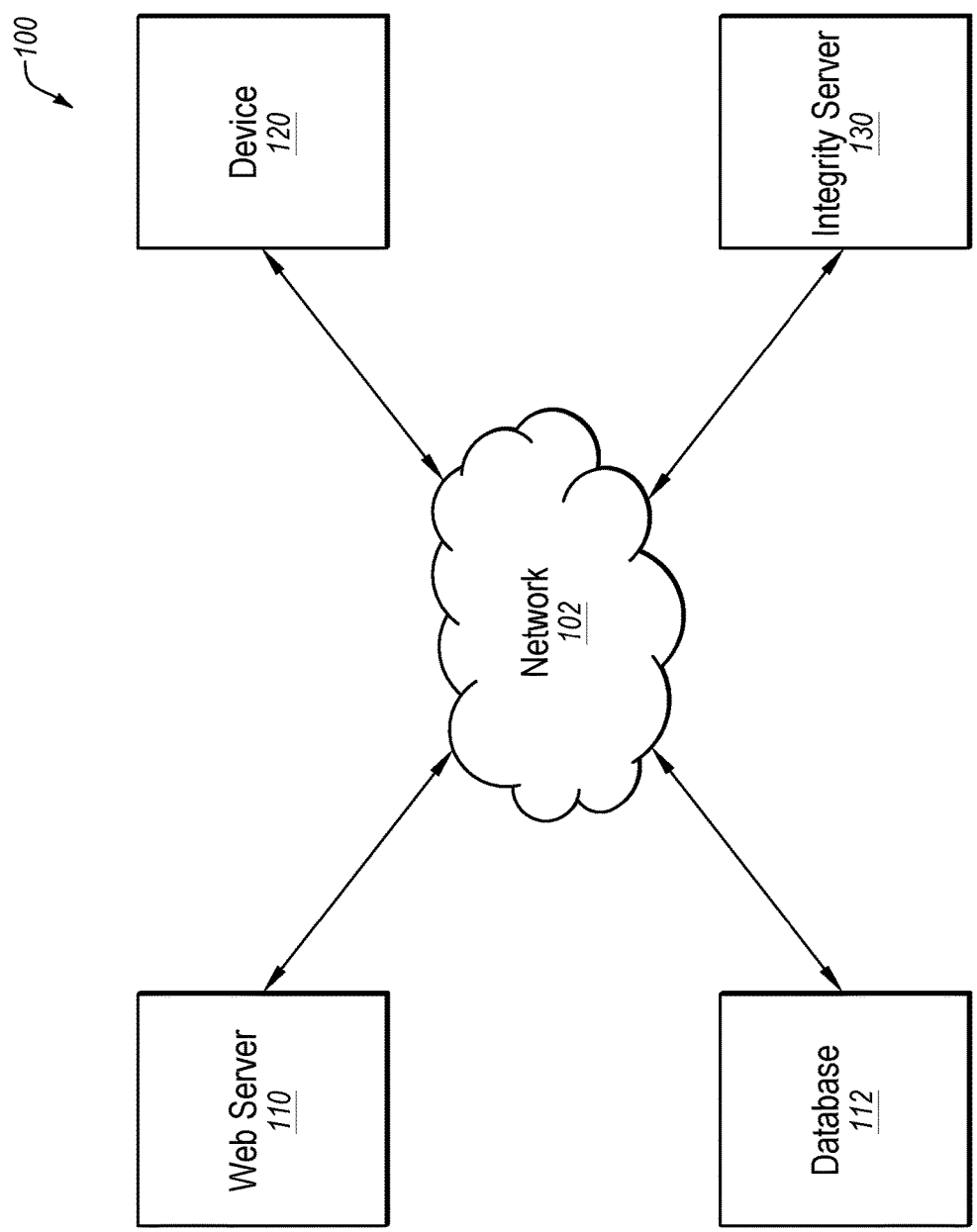
FIG. 1 illustrates an example environment to monitor integrity of webpages.

Some embodiments in this disclosure relate to systems and methods that may be configured to monitor integrity of security of webpages, which may include monitoring the structural integrity/security of the webpages. In some instances, the integrity of security of webpages may be compromised by third parties. The integrity of security of webpages may be compromised by third parties altering the source code or remotely called code of a webpage. The source code or remotely called code of webpages may be altered by the addition of extra code. The extra code may be configured to cause a browser rendering the webpage to directed data entered into the webpages to unauthorized third parties, such that the third parties steal or capture the data. The data may include financial information, such as a credit card or a bank account number, personal information, such as a social security number or driver license number, among other data. The additional code may not otherwise affect the operability of the webpage such that a user of the webpage or the owner of the webpage may be unaware that the integrity of security of the webpage is compromised.

To monitor the integrity of security of webpages, some web servers may implement software and processes to monitor the source code of the webpages while the source code is stored on the web servers. To monitor the source code, the web servers may use a file integrity monitoring (FIM) process. During a FIM process, monitoring tools on the web server may compare the current source code stored on the web server to a known version of the source code, referred to as known source code. In some embodiments, the known source code may be a clean or known good version of the source code. The known source code may be source code that was previously stored and for which there are no known security integrity issues. Differences between the known source code and the current source code determined based on the comparison may indicate whether the integrity of security of the webpage has been affected. For example, a third party may alter the source code of the webpage to cause the webpage to capture and direct financial information to an address of the third party without changing any other functionality of the webpage. The change in the source code of the webpage may be determined by comparing the source code to the known source code. However, monitoring the source code of the webpage at the web server does not provide an indication of integrity of security of the webpage with respect to altering of remotely called code used by devices to render the webpage.

As used in this disclosure, the source code of a webpage may include code that is stored by the web server in the root directory of a website that includes the webpage. The source code may be written in hypertext markup language (HTML) among other languages or combination of languages. The source code may be code that a web server provides initially in response to a request from a device for the webpage.

Remotely called code as used in this disclosure may include code that is not included in the source code hosted and provided originally by a web server, but code to which a link is included in the source code. The link may be configured to allow a browser application parsing and/or executing the source code or a web server parsing the source code before sending the source code to browser to link to and obtain the remotely called code. The remotely called code may be hosted by the web server that hosts the source code or another server or device may host the remotely called code. For example, the link may include a uniform resource identifier that points to additional code that may be downloaded and parsed by the browser application. The remotely called code may include HTML code, Cascading Stylesheets, JavaScript, JQuery, Flash, and ActionScript, among other types of code. The remotely called code may be configured to provide additional visual features, functionality, and/or other features of the webpage not defined by the source code of the webpage.

Rendered code as used in this disclosure may include source code and remotely called code that has been parsed and/or executed by a browser application and is the finalized instructions used by the browser to layout the presentation of the webpage on a device that requested the webpage from the web server. For example, the rendered code may represent a document object model (DOM) structure. In some embodiments, the rendered code may include elements that are only represented in the rendered code and not represented in the source code and/or the remotely called code without parsing and/or execution of the source code and/or the remotely called code.

Some embodiments in this disclosure relate to systems and methods that may be configured to monitor the integrity of source code and remotely called code by monitoring the rendered code of the webpage. In these and other embodiments, the rendered code of a webpage may be obtained. The rendered code may be generated using source code of the webpage obtained from a web server that hosts the source code and remotely called code referenced in the source code. The rendered code may be compared to a known version of the rendered code referred to as known rendered code. The known rendered code may be rendered code that was previously stored and for which there are no known security integrity issues. Differences between the known source code and the current source code determined based on the comparison may indicate whether the integrity of security of the webpage has been affected. In this manner, changes by a third party to source code and remotely called code of a webpage may be determined. Furthermore, in response to the determination of a change, the code of the webpage that is altered may be reconfigured to remove the changes made by the third party and thereby help to restore the integrity of security of the webpage.

The systems and methods described in this disclosure set forth a technical solution to a technological problem with respect to webpage security. The technological problem outlined herein regarding the identification of altered source code and altered remotely called code did not exist before computer technology and is directly related to computer technology. The systems and methods described in this disclosure set forth a technical solution to the technical problem that requires implementation by a computer or computer system. The technical solution may include obtaining code over networks, processing the code, comparing the code, and analyzing differences to determine the integrity of security of a webpage. Alternatively or additionally, the systems and methods described in this disclosure may solve other technological problems and provide other technical solutions.

Furthermore, the systems and methods described in this disclosure are at least in the technological field of Internet security, in particular the technological field with respect to website security. The systems and methods described in this disclosure may be relevant and useful in other technological fields as well.

Turning to the figures, FIG. 1 illustrates an example environment 100 to monitor integrity of webpages. The environment 100 may be arranged in accordance with at least one embodiment described in the present disclosure. The environment 100 may include a network 102, a web server 110, a database 112, a device 120, and an integrity server 130.

The network 102 may be configured to communicatively couple the web server 110, the database 112, the device 120, and/or the integrity server 130. In some embodiments, the network 102 may be any network or configuration of networks configured to send and receive communications between systems and devices. In some embodiments, the network 102 may include a wired network, an optical network, and/or a wireless network, and may have numerous different configurations. The network 102 may include one or more devices configured to allow communications between the web server 110, the database 112, the device 120, and/or the integrity server 130.

The web server 110 may include at least memory and a processor. The memory may include instructions that when executed by the processor may cause or direct the web server 110 to perform operations as described in this disclosure, among other operations.

The web server 110 may be configured to host a webpage of a website by storing source code of the webpage. In some embodiments, the webpage may include a field for entering personal data, such as financial data including: credit card information, debit card information, checking or saving account information, and/or other payment account information, among other financial data and/or personal data including: name, address, social security numbers, driver license numbers, passport numbers, and/or other personal information, among other information. For example, the webpage may be a checkout page of a website where a user of the webpage enters financial data.

In some embodiments, the web server 110 may be configured to receive requests for the webpage from outside sources. For example, browser applications on devices, such as a browser application on the device 120, may send a request to a URL of the web server 110 to request the webpage. The web server 110 may fulfill the request by sending the source code of the webpage to the requesting device. In these and other embodiments, the source code of the webpage may include one or more links to remotely called code that is not part of the source code of the webpage. In some embodiments, the remotely called code may not be provided by the web server 110 in response to an initial request from a device, such as the device 120, for the source code of the webpage. Alternatively or additionally, in response to an initial request from a device, the web server 110 may obtain the remotely called code and may provide the remotely called code with the source code to the requesting device, such as the device 120.

In some embodiments, the integrity of the source code of the webpage may be monitored. In these and other embodiments, a FIM process may be used to monitor the integrity of the source code. For example, during a FIM process, a version of the source code with no known integrity issues with respect to security of the source code may be obtained. The version of the source code with no known integrity issues with respect to security of the source code may be referred to in this disclosure as known source code.

During a FIM process, at particular times and/or intervals, the source code, which is stored on the web server 110 and that the web server 110 sends in a response to request from devices, may be compared with the known source code. During the FIM process, differences between the source code and the known source code may indicate a change in the integrity of security of the source code. A change in the integrity of security of the source code may indicate a change in the integrity of security of the webpage. A difference may cause an alert to be issued. In response to the alert, the source code may be altered to remove the portion of the code that resulted in the difference between the source code and the known source code. Note that during the FIM process, no monitoring of the remotely called code, which may be provided by the web server 110 with the source code or after providing the source code, may occur.

In some embodiments, another device, such as another server, may perform the FIM process with respect to the source code stored in the web server 110. Alternatively or additionally, the web server 110 may be configured to perform the FIM process. In these and other embodiments, the web server 110 may obtain the known source code from the memory or data storage in the web server 110. Alternatively or additionally, the web server 110 may obtain the known source code from another device.

The database 112 may include at least memory and a processor. The memory may include instructions that, when executed by the processor, may cause or direct the database 112 to perform operations as described in this disclosure, among other operations. The database 112 may be configured to store remotely called code of the webpage hosted by the web server 110. The remotely called code may include code to which a link is included in the source code of the webpage. The remotely called code may be configured to provide additional visual features, functionality, and/or other features of the webpage not defined by the source code of the webpage or to call additional code from another external source. For example, the remotely called code may include HTML code, JavaScript, JQuery, among other types of code.

The database 112 may be configured to receive requests for the remotely called code from outside sources. For example, browser applications on devices, such as a browser application on the device 120, in response to parsing and/or execution of the source code of the webpage may send a request to a URL of the database 112 to request the remotely called code. The database 112 may fulfill the request by sending the remotely called code to the requesting device.

The device 120 may be any electronic or digital computing device. For example, the device 120 may include a desktop computer, a server, networked computers, a laptop computer, a smartphone, a mobile phone, a tablet computer, smart watch or other smart wearable, or any other computing device that may be used to access a webpage. In some embodiments, the device 120 may include memory and at least one processor. In these and other embodiments, the memory may include computer-readable instructions that are configured to be executed by the processor to cause or direct the device 120 to perform operations described in this disclosure.

The device 120 may include a browser application that may be configured to perform actions with respect to requesting and render webpages. In these and other embodiments, the browser application may be configured to receive instructions from a user and in response to the instructions from the user, request and render webpages. For example, in some embodiments, the device 120 may be configured to request the webpage from the web server 110. In these and other embodiments, the device 120 may request the webpage in response to input from the user.

The device 120 may obtain the source code of the webpage from the web server 110. The browser application on the device 120 may parse and/or execute the source code. During the parsing/execution, the browser application may encounter a link in the source code to remotely called code. The browser application may be configured to request the remotely called code from the database 112 using the link in the source code. Alternatively or additionally, the device 120 may obtain the source code of the webpage and the remotely called code from the web server 110. In these and other embodiments, the web server 110 may encounter the link in the source code to the remotely called code, request the remotely called code, and provide the remotely called code and the source code to the device 120.

After receiving the remotely called code and the source code, the browser application may generate rendered code. The rendered code may be used by the browser application as the directions to paint the webpage on a display of the device 120. Thus, the rendered code may be final code that is generated based on the received remotely called code and source code.

In some embodiments, the device 120 may be configured to obtain a version of the rendered code with no known integrity issues with respect to security of the rendered code. The version of the rendered code with no known integrity issues with respect to security of the rendered code may be referred to in this disclosure as known rendered code. The known rendered code may be generated using a browser application in a manner analogous to the generation of the rendered code. However, the known rendered code may be generated before the generation of the rendered code. Alternatively or additionally, the known rendered code may be generated and checked such that the known rendered code does not include known security integrity issues.

In some embodiments, the device 120 may request the known rendered code from the integrity server 130 and obtain the known rendered code from the integrity server 130. In response to obtaining the known rendered code, the device 120 may be configured to compare the known rendered code to the rendered code to determine differences between the known rendered code and the rendered code. After determining the differences between the known rendered code and the rendered code, the device 120 may be configured to analyze the differences to determine a change in the integrity of security of the webpage. For example, during the analysis, when the device 120 determines that a change is associated with an improper altering of the rendered code, the device 120 may determine that the integrity of security of the webpage has been reduced.

As an example, the webpage may be a checkout page that describes and illustrates a good being purchased and information about a purchaser. Thus, the goods being purchased and information about a purchaser may change for each rendering of the webpage. As a result, the rendered code of the webpage used to paint the display on the device 120 may change for each rendering of the webpage. Thus, a portion of the rendered code may be different than a portion of the known rendered code. The difference between the rendered code and the known rendered code due to a different good being sold or a different purchaser, however, does not indicate that the integrity of security of the webpage has changed. Rather, the difference between the rendered code and the known rendered code due to a different good being sold or a different purchaser is an expected change of the rendered webpage. A change to a portion of the rendered code that is not expected to change based on different renderings of the webpage, however, would be considered an improper altering of the webpage. An improper altering of the webpage would indicate that the integrity of security of the webpage has changed.

In response to a change in the integrity of security of the webpage, the device 120 may be configured to generate an alert regarding the integrity of security of the webpage. The alert may be configured to trigger one or more actions. For example, the alert may trigger the presentation of an indication of the change in integrity of security of the webpage. The presentation of the indication of the change may be displayed on the display of the device 120, may be an audible sound or sounds, may be a vibration, or some other presentation of the indication.

As another example, the alert may be configured to trigger a message to be sent to the integrity server 130. Alternatively or additionally, the alert may be configured to trigger a message to be sent to the web server 110 or another device associated with the web server 110. In response to the message and the alert, the web server 110 and/or the other device may take corrective action to fix the improper altering of the webpage. In these and other embodiments, the message may include an indication of the improper altering of the webpage. Using the indication of the improper altering of the webpage, the improper altering may be fixed.

In some embodiments, the device 120 obtains the known rendered code and uses the known rendered code to determine a change in the integrity of security of the webpage based on one or more instructions executed by the device 120. In some embodiments, the one or more instructions may be part of the source code obtained from the web server 110. In these and other embodiments, the web server 110 may alter the source code to include the instructions to direct the device 120 to determine a change in the integrity of security of the webpage.

Alternatively or additionally, the instructions to direct the device 120 to determine a change in the integrity of security of the webpage may be obtained by the device 120 from the database 112 and/or the integrity server 130. In these and other embodiments, the source code obtained by the device 120 from the web server 110 may include a link to the instructions which the browser application may use to obtain the instructions. Alternatively or additionally, the instructions to direct the device 120 to determine a change in the integrity of security of the webpage may be obtained from an application associated with the browser application. For example, the application may be a plug-in application that is associated with the browser application.

The integrity server 130 may include at least memory and a processor. The memory may include instructions that when executed by the processor may cause or direct the integrity server 130 to perform operations as described in this disclosure.

In some embodiments, the integrity server 130 may be configured to generate the known rendered code. The integrity server 130 may be configured to generate the known rendered code before the device 120 requests the source code from the web server 110. In these and other embodiments, the integrity server 130 may include a browser application, proxy applications, web crawler agents, spiders, and/or bots that may be used during the generation of the known rendered code.

To generate the known rendered code, the integrity server 130 may be configured to request and obtain the source code from the web server 110. After obtaining the source code, the integrity server 130 may be configured to parse and/or execute the source code. In some embodiments, during the parsing/execution, the integrity server 130 may encounter a link in the source code to the remotely called code. The integrity server 130 may be configured to request the remotely called code from the database 112 using the link in the source code. Alternatively or additionally, the integrity server 130 may obtain the remotely called code from the web server 110 with the source code. After receiving the remotely called code and the source code, the integrity server 130 may generate the known rendered code. Alternatively or additionally, the known rendered code may be obtained from other protocols such as FTP, SFTP, and SSH, among others.

Modifications, additions, or omissions may be made to the environment 100 without departing from the scope of the present disclosure. For example, in some embodiments, the environment 100 may not include the database 112. In these and other embodiments, the remotely called code may be hosted by a different device. For example, in some embodiments, the web server 110 may host the remotely called code. In these and other embodiments, the device 120 may request the remotely called code from the web server 110 after obtaining the source code and parsing/executing the source code from the web server 110. Alternatively or additionally, the web server 110 may obtain the remotely called code and provide the source code and the remotely called code to the device 120 without a further request from the device 120.

As another example, the environment 100 may not include the integrity server 130. In these and other embodiments, the device 120 may include the known rendered code. Alternatively or additionally, when the environment 100 does not include the integrity server 130, the device 120 may include a server or network of servers. In these and other embodiments, the device 120 may be controlled by a company or entity whose purpose is to monitor the integrity of security of the webpage. For example, the device 120 may be hosted by an organization that hosts the web server 110 or at the request of an organization that hosts the web server 110. In these and other embodiments, the device 120 may be configured to request the source code from the web server 110 in an effort to monitor the integrity of security of the webpage and not necessarily to use the webpage.

As another example, the device 120 may not include or be configured to obtain instructions to monitor the integrity of security of the webpage. Rather, the device 120 may be configured to provide the rendered code to the integrity server 130. For example, the device 120 may include instructions to provide the rendered code to the integrity server 130. Alternatively or additionally, the source code may include instructions that may direct or cause the device 120 to provide the rendered code to the integrity server 130. In these and other embodiments, the integrity server 130 may be configured to obtain the known rendered code, determine the differences between the known rendered code and the rendered code from the device 120, and may analyze the differences to determine a change in the integrity of security of the webpage. In these and other embodiments, the integrity server 130 may generate the alert regarding the integrity of security of the webpage. The integrity server 130 may generate the alert by changing a status of the webpage within a system that includes the integrity server 130. A change in a status of the webpage may prompt a review or other action with respect to the webpage.

As another example, the database 112 may be another type of device. For example, the database 112 may be a server such as a file server, a mobile device, or any other computing device that is configured to store the remotely called code.

Figure 2A:
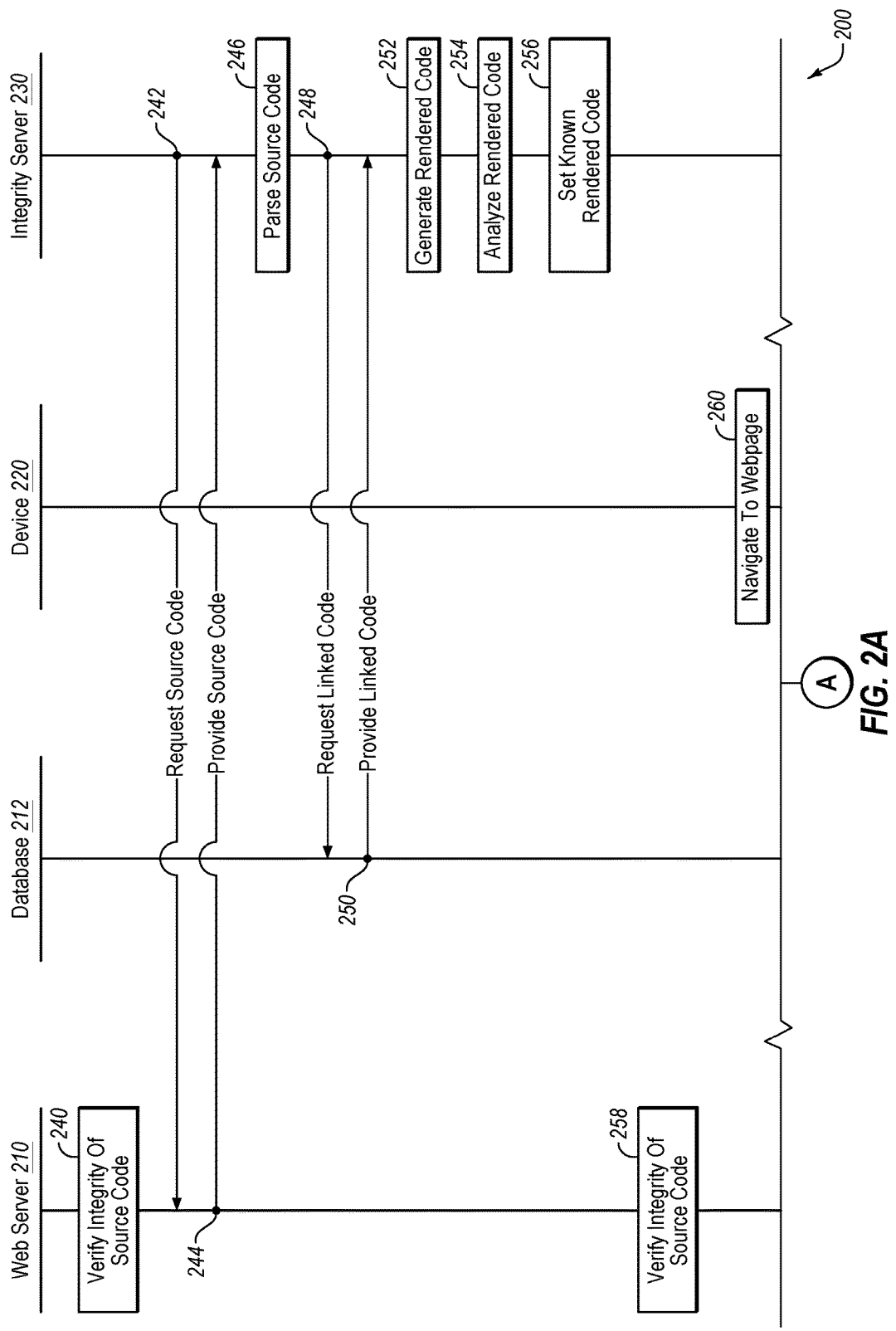
FIGS. 2A and 2B illustrate example operations to monitor integrity of webpages.
Figure 2B:
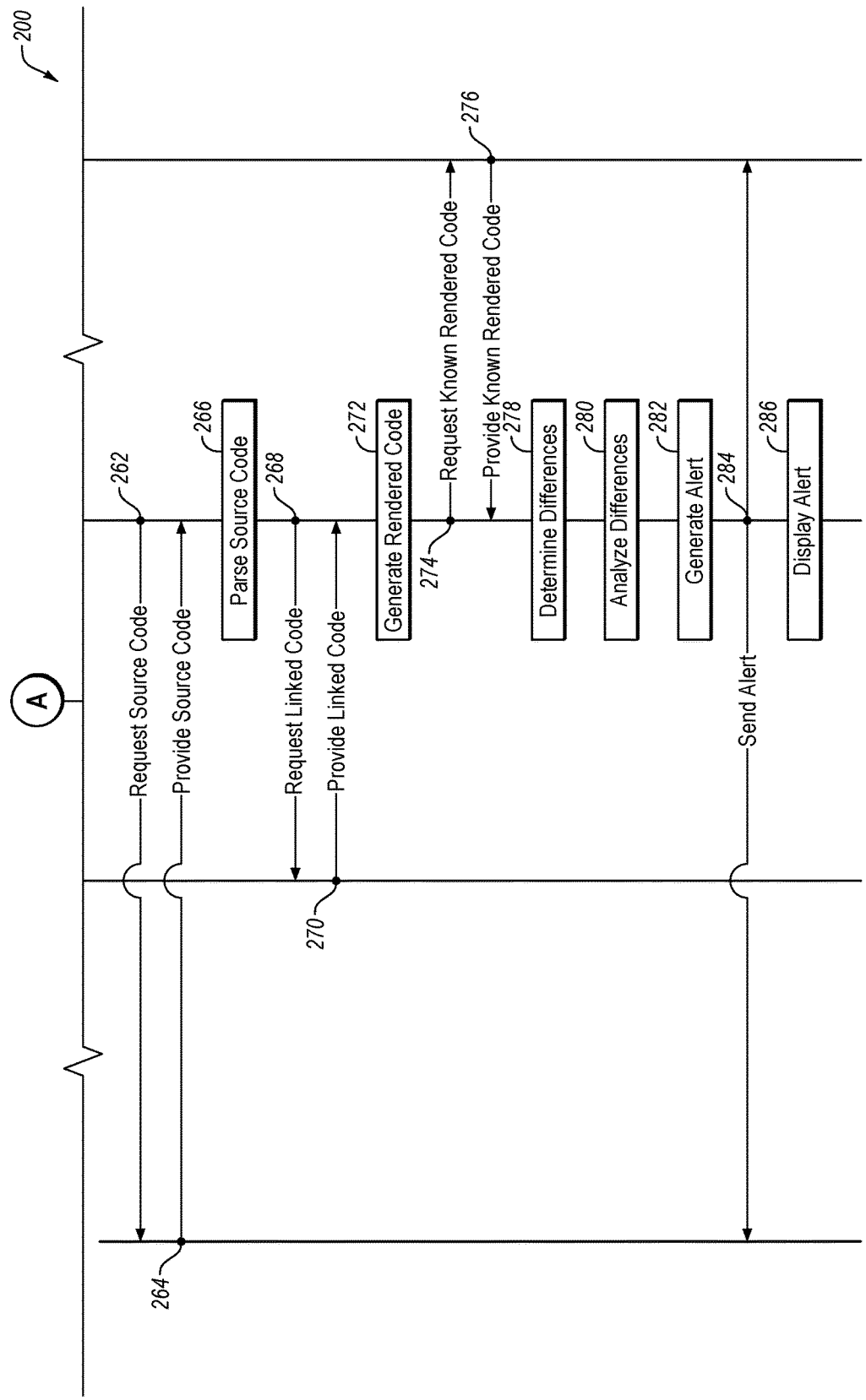

FIGS. 2A and 2B illustrate example operations 200 to monitor integrity of webpages. The operations 200 may be arranged in accordance with at least one embodiment described in the present disclosure. The operations 200 may be between a web server 210, a database 212, a device 220, and an integrity server 230.

In some embodiments, the web server 210, the database 212, the device 220, and the integrity server 230 may be analogous to the web server 110, the database 112, the device 120, and the integrity server 130 of FIG. 1, respectively. Accordingly, no further explanation is provided with respect thereto. Alternatively or additionally, the operations 200 may be an example of the operation of the elements of the environment of FIG. 1.

In some embodiments, the operations 200 may be an example of communications and interactions between the web server 210, the database 212, the device 220, and the integrity server 230. Generally, the operations 200 may relate to monitoring the integrity of security of webpages. The interactions between the web server 210, the database 212, the device 220, and the integrity server 230 may occur over one or more networks. The operations 200 illustrated are not exhaustive but are merely representative of operations 200 that may occur. Furthermore, one operation as illustrated may represent one or more communications, operations, and/or data exchanges.

At operation 240, integrity of security of source code of a webpage may be verified by the web server 210. In some embodiments, another device other than the web server 210 may be configured to verify the integrity of security of the source code. The verifying may be performed using a FIM process or another type of process. The verifying may include determining the source code is the same as previous captured source code for which there are no known security integrity issues. In some embodiments, the operation 240 may be performed as part of a routine verification of the source code and not directly related to the system and method described in this disclosure.

At operation 242, a request for the source code may be sent from the integrity server 230 to the web server 210. In some embodiments, the request may be made by a browser application running on the integrity server 230.

At operation 244, the source code may be provided by the web server 210 to the integrity server 230. The source code may include one or more links to remotely called code.

At operation 246, the source code may be parsed by the integrity server 230. In these and other embodiments, the source code may be parsed by the browser application running on the integrity server 230. Parsing the source code may identify links to remotely called code.

At operation 248, a request for remotely called code may be sent by the integrity server 230 to the database 212. The request may be based on a link in the source code. In these and other embodiments, the link may include a URI or other identifier of the database 212. Alternatively or additionally, the link may include an identifier of the remotely called code to be provided by the database 212. At operation 250, remotely called code may be provided by the database 212 to the integrity server 230.

In some embodiments, the operations 200 may not include the operations 248 and 250. In these and other embodiments, the remotely called code may be provided by the web server 210 in response to the request to provide the source code. In these and other embodiments, the web server 210 may parse the source code to determine the link in the source code. Using the link, the web server 210 may obtain the remotely called code and provide the remotely called code with the source code to the integrity server 230.

At operation 252, the rendered code of the webpage may be generated using the source code from the web server 210 and the remotely called code from the database 212. In these and other embodiments, the rendered code may be generated by the browser application running on the integrity server 230.

At operation 254, the rendered code of the webpage may be analyzed. In these and other embodiments, the rendered code may be analyzed to identify indicators that the integrity of security of the webpage is compromised. The indicators may include code that is associated with malware or that does not adhere with typical practice. Indicators may include tags, scripts, characters, comment blocks, calls, or other functions that are atypical, associated with malware, or otherwise appear out of place. The rendered code may also be analyzed with respect to the network connections established as directed by the rendered code. In particular, the network connections may be analyzed to identify connections that are atypical based on the location of the connection, timing of the connection, and/or the data transmitted over the network connections. In some embodiments, the network connections may be analyzed using heuristic scans, artificial intelligence, or other analysis techniques.

At operation 256, the rendered code may be set as known rendered code. In these and other embodiments, the rendered code may be set as the known rendered code in response to the analysis of the rendered code not identifying indicators that the integrity of security of the webpage is compromised.

In some embodiments, the integrity server 230 may be configured to generate multiple different versions of the known rendered code. The different versions of the known rendered code may be generated to account for different versions of the source code associated with different requesting devices. For example, the web server 210 may host multiple different types of source code for a single webpage. The different types of source code may be provided by the web server 210 in response to the type of device that is requesting the webpage. For example, the web server 210 may include source code for providing in response to a request from a personal computer that is different from the source code provided to a mobile device.

Alternatively or additionally, the different versions of the known rendered code may be generated to account for variations in rendered code that may occur based on the browser application that generates the rendered code. For example, a first browser application and a second browser application using the same source code and remotely called code may generate different rendered code.

In some embodiments, one or more of the operations of 242, 244, 246, 248, 250, 252, 254, and 256 may be repeated by the integrity server 230 to generate different versions of the rendered code to account for the different browser applications that may generate the rendered code and the variations in source code provided by the web server 210.

At operation 258, integrity of security of the source code of the webpage may be verified. The operation 258 may be performed in a manner analogous to or different from the operation 240. The operation 258 may be performed after the operation 256. The operation 258 may be performed as part of routine verification of the source code and not directly related to the system and method described in this disclosure.

At operation 260, a request to navigate to the webpage may be obtained by the device 220. The request may be obtained from a user of the device 220. The request may be provided to a browser application that is running on the device 220.

At operation 262, a request for the source code may be sent from the device 220 to the web server 210. The request for the source code may be in response to the request to navigate to the webpage. In some embodiments, the request may be made by the browser application running on the device 220.

At operation 264, the source code may be provided by the web server 210 to the device 220. The source code may include one or more links to remotely called code and may be analogous to the source code provided by the web server 210 to the integrity server 230.

At operation 266, the source code may be parsed by the device 220. In these and other embodiments, the source code may be parsed by the browser application running on the device 220. Parsing the source code may identify links to remotely called code.

At operation 268, a request for remotely called code may be sent by the device 220 to the database 212. The request may be based on a link in the source code. In these and other embodiments, the link may include a URI or other identifier of the database 212. Alternatively or additionally, the link may include an identifier of the remotely called code to be provided by the database 212. At operation 270, the remotely called code may be provided by the database 212 to the device 220.

In some embodiments, the operations 200 may not include the operations 268 and 270. In these and other embodiments, the remotely called code may be provided by the web server 210 in response to the request to provide the source code. In these and other embodiments, the web server 210 may parse the source code to determine the link in the source code. Using the link, the web server 210 may obtain the remotely called code and provide the remotely called code with the source code to the device 220.

At operation 272, the rendered code of the webpage may be generated using the source code from the web server 210 and the remotely called code from the database 212. In these and other embodiments, the rendered code may be generated by the browser application running on the device 220.

At operation 274, a request for known rendered code may be sent from the device 220 to the integrity server 230. The request for the known rendered code may include, an indication of the webpage, the type of the integrity server 230, and the type of the browser application that is running on the device 220 that generated the rendered code.

At operation 276, the known rendered code may be provided by the integrity server 230 to the device 220. In some embodiments, the known rendered code that is provided may be selected based on the type of the device 220 and the type of the browser application. For example, the integrity server 230 may include known rendered code for multiple different webpages. Based on the indication of the webpage, the integrity server 230 may source the known rendered webpage for the webpage rendered by the device 220.

Alternatively or additionally, the integrity server 230 may include multiple different versions of the known rendered code for the same webpage. The different versions of the known rendered code may be rendered by different combinations of devices and/or browsers. For example, a first version of the known rendered code may be generated by a mobile device using a first browser type. A second version of the known rendered code may be generated by a mobile device using a second browser type. A third version of the known rendered code may be generated by a desktop personal computer using the first browser type. In these and other embodiments, the integrity server 230 may select the known rendered code based on the type of the device 220, the type of the browser, or the type of the device 220 and the type of the browser.

At operation 278, the rendered code may be compared to the known rendered code by the device 220 to determine differences between the rendered code and the known rendered code. In some embodiments, the rendered code and the known rendered code may be hashed before the comparison. In these and other embodiments, the rendered code and the known rendered code may be hashed in different manners. For example, a line by line hash of the rendered code and the known rendered code may be performed. Alternatively or additionally, document model object nodes of the rendered code and the known rendered code may be hashed.

In these and other embodiments, the hashes of the rendered code and the known rendered code may be compared. For example, the comparison may be performed using fuzzing hashing algorithms among other type of comparison algorithms. In these and other embodiments, the known rendered code provided by the integrity server 230 may be in hashed form.

At operation 280, the differences between the rendered code and the known rendered code may be analyzed. The analysis of the differences may be performed to determine a change in integrity of security of the webpage.

In some embodiments, not all differences between the rendered code and the known rendered code may result in the analysis indicating a change in the integrity of security of a webpage. For example, the webpage may be a checkout page that describes and illustrates a good being purchased and information about a purchaser. When the device 220 requests the checkout page for a first time, the checkout page may include a first good. When the device 220 requests the checkout page for a second time, the checkout page may include a second code. If a different device requests the checkout page, the good and/or personal information on the checkout page may be different. As a result, at least a portion of the rendered code of the webpage used to paint the display on the device 220 may change for each rendering of the webpage based on certain information used during a browsing session that requests the webpage. Alternatively or additionally, a portion of the rendered code of the webpage used to paint the display on the device 220 may not change for each rendering of the webpage even with different information being used during a browsing session that requests the webpage.

Because at least a portion of the rendered code of the webpage may change for each rendering of the webpage, a portion of the rendered code may be different than a portion of the known rendered code. Likewise a portion of the rendered code may be the same as a portion of the known rendered code. In these and other embodiments, the analysis may include analyzing comparisons of different portions of the rendered code differently. In these and other embodiments, a portion of the rendered code may include an HTML object or multiple HTML objects, among other divisions of the rendered code.

For portions of the rendered code that are expected to be the same as the known rendered code, any differences between the rendered code and the known rendered code in these portions may be an indication of a change in integrity of security of the webpage.

For portions of the rendered code that are expected to not be the same as the known rendered code, an amount of the difference between the rendered code and the known rendered code may be compared to a threshold difference amount. The amount of the difference between the rendered code and the known rendered code in these portions being above a threshold difference amount may indicate a change in integrity of security of the webpage. In these and other embodiments, the difference being below the threshold difference amount may not be an indication of a change in integrity of security of the webpage even though a difference exists.

The threshold difference amount may vary based on each portion of the code being analyzed. For example, a first portion of rendered code that includes customer information displayed on the webpage may have a corresponding threshold difference amount greater than a second portion of rendered code that includes shipping options displayed on the webpage because the customer information may be expected to vary more than shipping options for different renderings of the webpage. In these and other embodiments, the threshold difference amount may be determined based on an expected change in the portion of the rendered code to which the threshold difference corresponds. The expected change may be determined based on known variances of information to be included in the portions of the source code, remotely called code, or rendered code.

At operation 282, an alert may be generated in response to a change in the integrity of security of the webpage. The alert may be regarding the integrity of security of the webpage. The alert may be a trigger for the device 220 or other devices to perform functions with respect to a change in the integrity of security of the webpage.

At operation 284, the alert may be provided to other devices. For example, the alert may be provided to the integrity server 230 or the web server 210, among other devices. In some embodiments, when the integrity server 230 receives the alert, the integrity server 230 may provide the alert to the web server 210. Alternatively or additionally, the integrity server 230 may provide the alert to another device associated with an organization that controls the web server 210.

In some embodiments, the web server 210 may take action in response to the alert. For example, the web server 210 may disable a portion or all of the webpage. For example, the web server 210 may indicate to request for the webpage that the webpage is no longer active. Alternatively or additionally, the web server 210 may send out notices to other servers associated with the web server 210 regarding the alert. Alternatively or additionally, the web server 210 may provide notices to other devices that have received the webpage regarding the change in integrity of security of the webpage. Alternatively or additionally, the web server 210 may be configured to alert a webmaster or other person associated with managing the web server 210.

At operation 286, an alert may be displayed by the device 220. The alert may be displayed on a display of the device 220 that is concurrently displaying the webpage. The alert may indicate that the integrity of security of the webpage may be comprised. Alternatively or additionally, the alert may indicate how the integrity of security of the webpage may be comprised. For example, the alert may indicate or include the portion of the rendered code that results in a change in integrity of security of the webpage. In these and other embodiments, the portion of the rendered code included may include the source code and/or remotely called code used to generate the rendered code.

In some embodiments, the alert may disable portions of the webpage. For example, the alert may disable network connections established by the webpage. Alternatively or additionally, the alert may disable the entire webpage.

Modifications, additions, or omissions may be made to the operations 200 without departing from the scope of the present disclosure. For example, in some embodiments, the operations 200 may include one or more additional operations. For example, the operations 200 may include analysis of the rendered code that is not based on the differences between the rendered code and the known rendered code. For example, the rendered code may be analyzed to identify indicators that the integrity of security of the webpage is compromised. The indicators may include code that is associated with malware or that does not adhere with typical practice. Indicators may include tags, scripts, characters, comment blocks, calls, or other functions that are atypical, associated with malware, or otherwise appear out of place. The rendered code may also be analyzed with respect to the network connections established as directed by the rendered code. In particular, the network connections may be analyzed to identify connections that are atypical based on the location of the connection, timing of the connection, and/or the data transmitted over the network connections. In some embodiments, the network connections may be analyzed using heuristic scans, artificial intelligence, or other analysis techniques. In these and other embodiments, when the analysis of the rendered code indicates a change in the integrity of security of the webpage, the alert may be generated.

As another example, in some embodiments, the operations 200 may be arranged in a different order. For example, the operations 274 and 276 may occur before the operation 272. Alternatively or additionally, in some embodiments, one or more of the operations 200 may not be included. For example, the operations of 240 and/or 258 may not be included. Alternatively or additionally, the operation 254 may not be included. Alternatively or additionally, the operation 278 may not be included. In these and other embodiments, the analysis of the rendered code may include identifying indicators that the integrity of security of the webpage is compromised.

As another example, in some embodiments, none of the operations may be performed by the integrity server 230. In these and other embodiments, the device 220 may perform all of the operations associated with the integrity server 230. Alternatively or additionally, none of the operations may be performed by the database 212. In these and other embodiments, the web server 210 may perform all of the operations associated with the database 212. Alternatively or additionally, the integrity server 230 may perform some of the operations performed by the device 220. For example, the integrity server 230 may perform operations 278, 280, 282, and 284 after the device 220 provides the rendered code to the integrity server 230.

Figure 3:
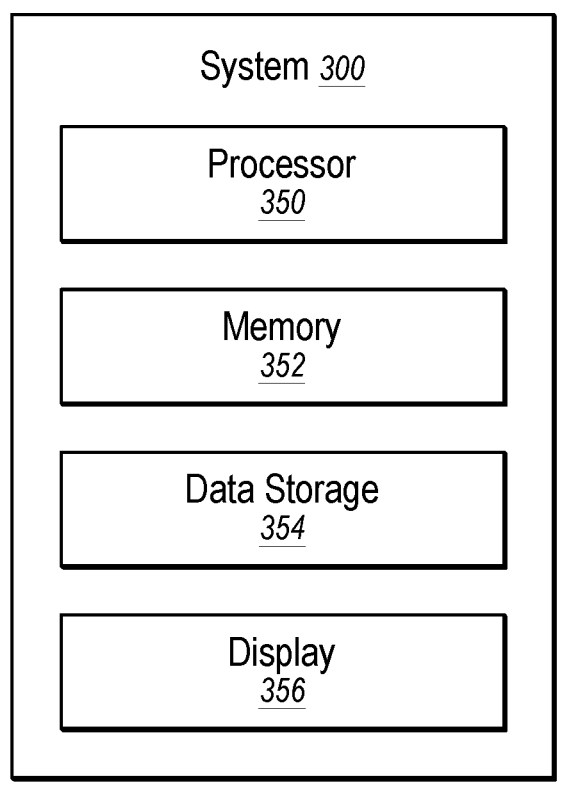
FIG. 3 illustrates an example system that may be used to monitor integrity of webpages.

FIG. 3 illustrates a block diagram of an example computing system 300. The computing system 300 may be configured according to at least one embodiment of the present disclosure and may be configured to perform one or more operations related to monitoring the integrity of webpages. The computing system 300 may include a processor 350, a memory 352, a data storage 354, and a display 356. The processor 350, the memory 352, the data storage 354, and the display 356 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

For example, in some embodiments, the computing system 300 may be part of the web server 110 or the web server 210. In these and other embodiments, the example computing system 300 may be configured to verify integrity of source code and provide the source code in response to a request for the source code, among other operations.

As another example, the computing system 300 may be part of the device 120 or the device 220. In these and other embodiments, the computing system 300 may be configured to navigate to a webpage, display the webpage on the display 356, obtain source code and remotely called code of the webpage, generated rendered code, analyze the rendered code, and display an alert on the display 356 in response to the analysis of the rendered code indicating the integrity of security of the source code is changed, among other operations.

As another example, the computing system 300 may be part of the integrity server 130 or the integrity server 230. In these and other embodiments, the computing system 300 may be configured to generate known rendered code and provide the rendered code, among other operations.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Modifications, additions, or omissions may be made to the computing system 300 without departing from the scope of the present disclosure. For example, in some embodiments, the computing system 300 may include any number of other components that may not be explicitly illustrated or described.

Figure 4:
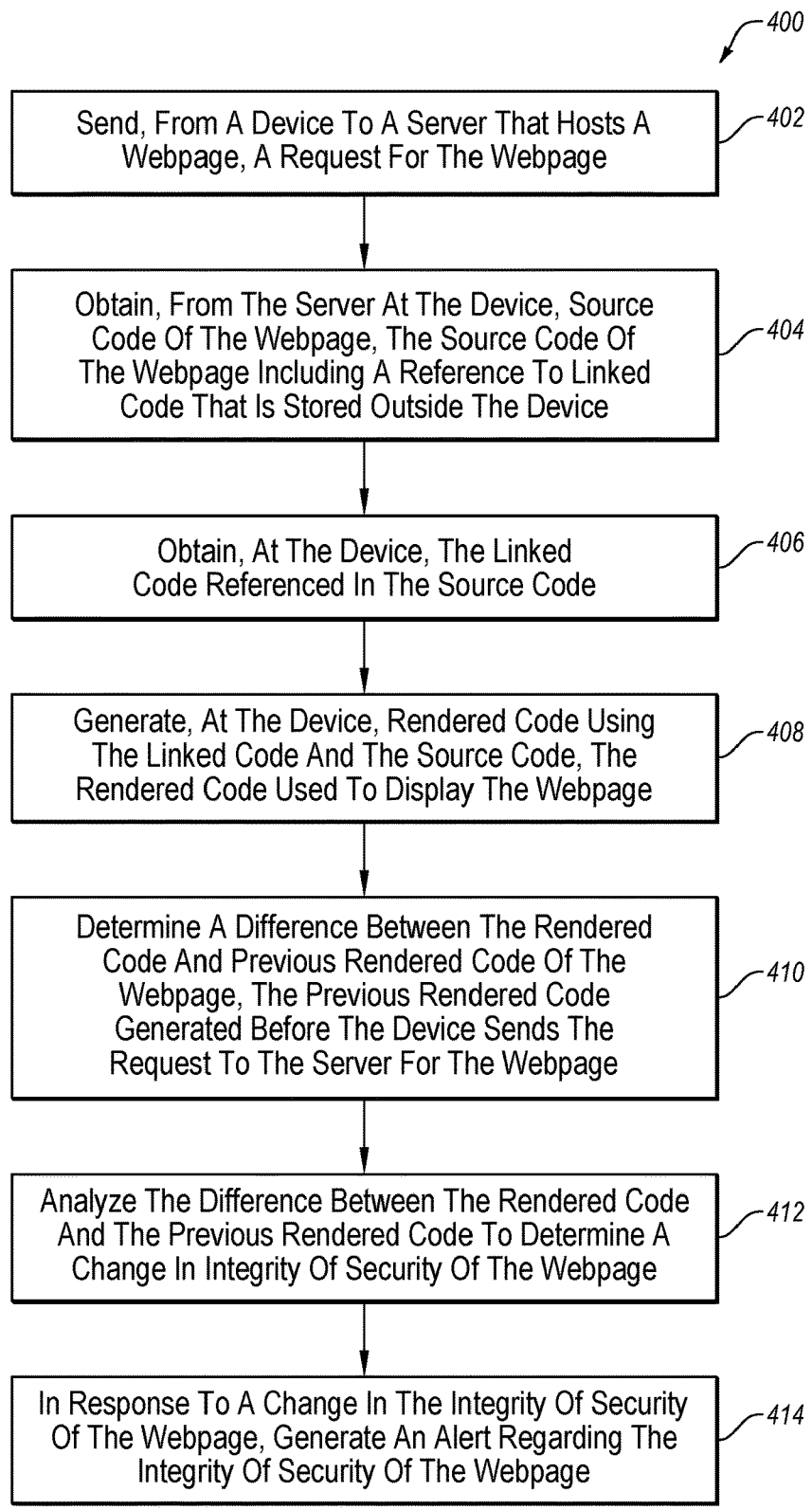
FIG. 4 is a flowchart of an example method to monitor integrity of webpages.

FIG. 4 is a flowchart of an example method 400 to monitor integrity of webpages. The method 400 may be arranged in accordance with at least one embodiment described in the present disclosure. The method 400 may be performed, in some embodiments, by a device or system, such as the device 120 and/or the integrity server 130 of FIG. 1, the device 220 and/or the integrity server 230 of FIGS. 2A and 2B or the computing system 300 of FIG. 3, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a request for a webpage is sent from a device to a server that hosts the webpage. In some embodiments, before the request for the webpage is sent, the integrity of security of the source code of the webpage may be evaluated at the server that hosts the source code of the webpage.

At block 404, source code of the webpage may be obtained from the server at the device. The source code of the webpage may include a reference to remotely called code that is stored outside the device.

At block 406, the remotely called code referenced in the source code may be obtained at the device. At block 408, rendered code may be generated at the device using the remotely called code and the source code. The rendered code may be used to display the webpage.

At block 410, a difference between the rendered code and previous rendered code of the webpage may be determined. The previous rendered code may be generated before the device sends the request to the server for the webpage. In some embodiments, the previous rendered code may be generated using second remotely called code that is different than the remotely called code. In these and other embodiments, the differences between the rendered code and previous rendered code may be based on a difference between the second remotely called code and the remotely called code.

In some embodiments, the rendered code may be generated using a browser application using the remotely called code and using the source code. In these and other embodiments, the previous rendered code may be generated by a same type of browser as the browser application that generates the rendered code. Alternatively or additionally, the previous rendered code of the webpage may be obtained from a second server distinct from the server that hosts the webpage.

At block 412, the difference between the rendered code and the previous rendered code may be analyzed to determine a change in integrity of security of the webpage. In some embodiments, analyzing the difference between the rendered code and the previous rendered code may include determining when the difference between the rendered code and the previous rendered code occurs in a location of the rendered code that is not changed when generated by different devices.

At block 414, in response to a change in the integrity of security of the webpage, an alert regarding the integrity of security of the webpage may be generated. In some embodiments, in response to the alert, an indication of the integrity of security of the webpage may be displayed on the device concurrent with a display of the webpage using the rendered code.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include before determining the difference, sending the rendered code to a second server distinct from the server that hosts the webpage. In these and other embodiments, the second server performs the steps of: determining the difference between the rendered code and the previous rendered code of the webpage, analyzing the difference between the rendered code and the previous rendered code, and generating an alert.

Alternatively or additionally, the method 400 may further include hashing the rendered code. In these and other embodiments, the difference between the rendered code and the previous rendered code of the webpage may be determined by comparing the hashes of the rendered code with hashes of the previous rendered code.

Figure 5:
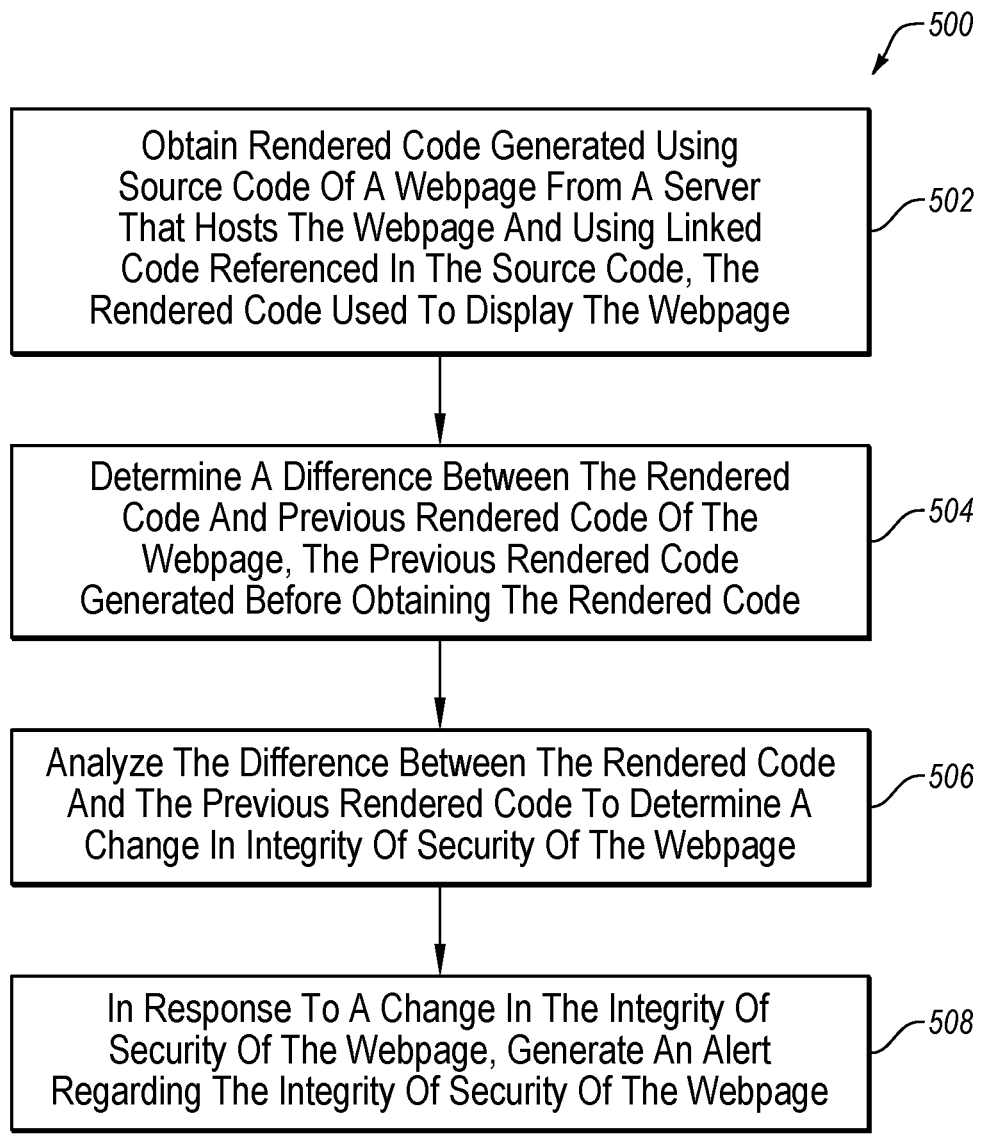
FIG. 5 is a flowchart of another example method to monitor integrity of webpages.

FIG. 5 is a flowchart of another example method 500 to monitor integrity of webpages. The method 500 may be arranged in accordance with at least one embodiment described in the present disclosure. The method 500 may be performed, in some embodiments, by a device or system, such as the device 120 and/or the integrity server 130 of FIG. 1, the device 220 and/or the integrity server 230 of FIGS. 2A and 2B or the computing system 300 of FIG. 3, or another device. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where rendered code generated using source code of a webpage from a server that hosts the webpage and using remotely called code referenced in the source code may be obtained. The rendered code may be used to display the webpage. In some embodiments, before obtaining the rendered code, the integrity of security of the source code of the webpage may be evaluated at the server that hosts the source code of the webpage.

At block 504, a difference between the rendered code and previous rendered code of the webpage may be determined. The previous rendered code may be generated before obtaining the rendered code. In some embodiments, the previous rendered code may be generated using second remotely called code that is different than the remotely called code. In these and other embodiments, the difference between the rendered code and previous rendered code may be based on a difference between the second remotely called code and the remotely called code. In some embodiments, the previous rendered code of the webpage may be obtained from a second server distinct from the server that hosts the webpage.

Alternatively or additionally, the rendered code may be generated using a browser application using the remotely called code and using the source code. In these and other embodiments, the previous rendered code may be generated by a same type of browser as the browser application that generates the rendered code.

At block 506, the difference between the rendered code and the previous rendered code may be analyzed to determine a change in integrity of security of the webpage. In these and other embodiments, analyzing the difference between the rendered code and the previous rendered code may include determining when the difference between the rendered code and the previous rendered code occurs in a location of the rendered code that is not changed when generated by different devices.

At block 508, in response to a change in the integrity of security of the webpage, an alert may be generated regarding the integrity of security of the webpage.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include hashing the rendered code. In these and other embodiments, the difference between the rendered code and the previous rendered code of the webpage may be determined by comparing the hashes of the rendered code with hashes of the previous rendered code.

As indicated above, the embodiments described herein may include the use of a special purpose or general purpose computer (e.g., the processor 350 of FIG. 3) including various computer hardware or software modules, as discussed in greater detail below. Further, as indicated above, embodiments described herein may be implemented using computer-readable media (e.g., the memory 352 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method to monitor integrity of webpages, the method comprising:
   sending, from a device to a server that hosts a webpage, a request for the webpage;
   obtaining, from the server at the device, source code of the webpage, the source code of the webpage including a reference to remotely called code that is stored outside the device;
   obtaining, at the device, the remotely called code referenced in the source code;
   generating, at the device, rendered code using the remotely called code and the source code, the rendered code being finalized instructions to layout presentation of the webpage and the rendered code including elements not represented in the remotely called code and the source code without parsing and/or executing the remotely called code and the source code;
   obtaining previous rendered code of the webpage, the previous rendered code generated before the device sends the request to the server for the webpage using the source code;
   determining a difference between the rendered code and the previous rendered code of the webpage;
   analyzing the difference between the rendered code and the previous rendered code to determine a change in integrity of security of the webpage; and
   in response to a change in the integrity of security of the webpage, generating an alert regarding the integrity of security of the webpage.

2. The method of claim 1, wherein the previous rendered code is generated using second remotely called code that is different than the remotely called code and the difference between the rendered code and previous rendered code is based on a difference between the second remotely called code and the remotely called code.

3. The method of claim 1, further comprising obtaining the previous rendered code of the webpage from a second server distinct from the server that hosts the webpage.

4. The method of claim 1, wherein the rendered code is generated using a browser application using the remotely called code and using the source code and the previous rendered code is generated by a same type of browser as the browser application that generates the rendered code.

5. The method of claim 1, wherein before the request for the webpage is sent, the integrity of security of the source code of the webpage is evaluated at the server that hosts the source code of the webpage.

6. The method of claim 1, further comprising before determining the difference, sending the rendered code to a second server distinct from the server that hosts the webpage, wherein the second server performs the steps of: obtaining previous rendered code of the webpage, determining the difference between the rendered code and the previous rendered code of the webpage, analyzing the difference between the rendered code and the previous rendered code, and generating an alert.

7. The method of claim 1, further comprising hashing the rendered code, wherein the difference between the rendered code and the previous rendered code of the webpage are determined by comparing the hashes of the rendered code with hashes of the previous rendered code.

8. The method of claim 7, wherein hashing the rendered code includes one or more of hashing of document object model nodes of the rendered code or hashing individual lines of the rendered code and wherein the hashing the rendered code includes fuzz hashing the rendered code.

9. The method of claim 1, wherein analyzing the difference between the rendered code and the previous rendered code includes determining when the difference between the rendered code and the previous rendered code occurs in a location of the rendered code that is not changed when generated by different devices.

10. The method of claim 1, wherein the device is a server system and the server system is configured to generate the previously rendered code.

11. The method of claim 1, wherein the change in integrity of security of the webpage is a reduction of the integrity of security of the webpage and the difference between the rendered code and the previous rendered code is based on an altering of the rendered code due to the remotely called code.

12. A method to monitor integrity of webpages, the method comprising:
  obtaining, at a server, rendered code generated using source code of a webpage obtained in response to a request to a web server that hosts the webpage and using remotely called code referenced in the source code, the rendered code being finalized instructions to layout presentation of the webpage and the rendered code including elements not represented in the remotely called code and the source code without parsing and/or executing the remotely called code and the source code;
  obtaining, at the server, previous rendered code of the webpage, the previous rendered code generated before the request is sent to the webserver for the source code used to generate the rendered code;
  determining, at the server, a difference between the rendered code and the previous rendered code of the webpage;
  analyzing, at the server, the difference between the rendered code and the previous rendered code to determine a change in integrity of security of the webpage; and
  in response to a change in the integrity of security of the webpage, generating an alert regarding the integrity of security of the webpage.

13. The method of claim 12, wherein the change in integrity of security of the webpage is a reduction of the integrity of security of the webpage and the difference between the rendered code and the previous rendered code is based on an altering of the rendered code due to the remotely called code.

14. The method of claim 12, wherein the rendered code is obtained from a device that sends the request to the web server and that generates the rendered code, wherein the device is instructed to send the rendered code to the server based on instructions in the source code.

15. A system comprising:
  at least one non-transitory computer-readable media configured to store one or more instructions; and
  at least one processor coupled to the at least one non-transitory computer-readable media, the at least one processor configured to execute the instructions to cause or direct the system to perform operations, the operations comprising:
    obtain rendered code generated using source code of a webpage obtained in response to a request to a server that hosts the webpage and using remotely called code referenced in the source code, the rendered code being finalized instructions to layout presentation of the webpage and the rendered code including elements not represented in the remotely called code and the source code without parsing and/or executing the remotely called code and the source code;
    obtain previous rendered code of the webpage, the previous rendered code generated before the request is sent to the server for the source code used to generate the rendered code;
    determine a difference between the rendered code and the previous rendered code of the webpage, the previous rendered code generated before obtaining the rendered code;
    analyze the difference between the rendered code and the previous rendered code to determine a change in integrity of security of the webpage; and
    in response to a change in the integrity of security of the webpage, generate an alert regarding the integrity of security of the webpage.

16. The system of claim 15, wherein the previous rendered code is generated using second remotely called code that is different than the remotely called code and the difference between the rendered code and previous rendered code is based on a difference between the second remotely called code and the remotely called code.

17. The system of claim 15, wherein the rendered code is generated using a browser application using the remotely called code and using the source code and the previous rendered code is generated by a same type of browser as the browser application that generates the rendered code.

18. The system of claim 15, wherein before obtaining the rendered code, the integrity of security of the source code of the webpage is evaluated at the server that hosts the source code of the webpage.

19. The system of claim 15, wherein the rendered code is obtained from a device that generates the rendered code and the device is instructed to send the rendered code to the system based on instructions in the source code.

20. The system of claim 15, wherein analyzing the difference between the rendered code and the previous rendered code includes determining when the difference between the rendered code and the previous rendered code occurs in a location of the rendered code that is not changed when generated by different devices.

* * * * *